United States Patent Office 3,107,229
Patented Oct. 15, 1963

3,107,229
PROCESS FOR STABILIZING POLYOLEFINS
Hugo Malz, Leverkusen, and Friedrich Lober and Otto Bayer, Leverkusen-Bayerwerk, and Hans Scheurlen, Leverkusen, Germany, assignors to Farbenfabriken Bayer Aktiengesellschaft, Leverkusen, Germany, a corporation of Germany
No Drawing. Filed Aug. 3, 1959, Ser. No. 831,057
Claims priority, application Germany Aug. 7, 1958
3 Claims. (Cl. 260—45.8)

This invention relates to the stabilization of polyolefins.

Polymeric olefins, such for example as polyethylene, polypropylene or polybutylene, experience uncontrollable changes under the reaction of atmospheric oxygen and ozone. These changes become apparent by undesired discolorations and by deterioration in the mechanical properties of plastics manufactured therefrom. The influence of heat and light considerably promotes such degradation and embrittlement processes, so that polyolefins seem to be unsuitable for many uses.

The attempt has already been made to prevent such ageing phenomena with polyolefins by adding anti-oxidizing agents and stabilizers. As well as those agents which are known as age-resistors in natural and synthetic rubber (for example alkyl phenols, p-phenylene diamine and naphthylamine derivatives), sulfur-containing compounds such as thiuramdisulfides, phenol sulfides and mercaptans have inter alia also been proposed for these purposes. The action of these compounds is usually only limited and slight, especially with prolonged stressing of the polyolefins.

In addition, the use of the above compounds frequently involves a discoloration of the polymers and considerable odor when producing and processing the mixtures.

It has now been found that polyolefins can be excellently protected against harmful influence of atmospheric oxygen and ozone, even with the simultaneous action of heat and light, if the polyolefins have added thereto compounds of the general formula $$R-SO_2-N=S\begin{matrix}R_1\\R_2\end{matrix}$$

in which R represents an aryl radical which may be substituted and $R_1$ and $R_2$ can represent like or different substituted or unsubstituted hydrocarbon radicals or amine groups and $R_2$ may also represent a sulfonamide, isourea, isothiourea, guanidine or amidine radical. The aryl hydrocarbon radicals may, for example, be substituted by alkyl, preferably lower alkyl, halogen, nitro, alkoxy, aroxy groups or ether or thioether groupings.

The compounds used for the process according to the invention can be obtained by reacting N-halogen-alkali metal sulfonamides with suitable sulfur compounds, such as for example thioethers, sulfenamide compounds, mercaptans, disulfides (see for example Houben-Weyl, 4th edition, vol. IX, page 220; G. Bulmer and F. G. Mann, "Journal of the Chemical Society" (1945), page 666), or diaminomonosulfides. The novel reaction with the diaminomonosulfides is preferably carried out in an inert diluent. It is possible for example to use water, ketones, alcohols, hydrocarbons or ethers, or mixtures of these compounds as diluent or solvent. In order to accelerate the reaction, it is also possible to work at elevated temperatures. The reaction mixture can be worked up in the usual way, for example by removing the solvent or by precipitating the iminodiamides which are formed, for example by adding water. Some of the compounds which may be used in the invention are given as examples in the following Table I:

TABLE I

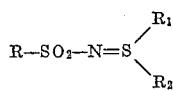

| | | °F. |
|---|---|---|
| (1) | $(CH_3-)_2S=N-SO_2-\langle\phantom{xx}\rangle-CH_3$ | 133 |
| (2) | $(C_2H_5-)_2S=N-SO_2-\langle\phantom{xx}\rangle-CH_3$ | 144 |
| (3) | $(Cl-CH_2-CH_2-)_2S=N-SO_2-\langle\phantom{xx}\rangle-CH_3$ | 144.5 |
| (4) | $(\langle\phantom{xx}\rangle-)_2S=N-SO_2-\langle\phantom{xx}\rangle-CH_3$ | 193 |
| (5) | $(\langle\phantom{xx}\rangle-CH_2-)_2S=N-SO_2-\langle\phantom{xx}\rangle$ | 150 |
| (6) | $\langle\phantom{xx}\rangle-S\begin{matrix}N(C_2H_5)_2\\N-SO_2-\langle\phantom{xx}\rangle-CH_3\end{matrix}$ | 88 |
| (7) | $O_2N-\langle\phantom{xx}\rangle-S\begin{matrix}N(C_2H_5)_2\\N-SO_2-\langle\phantom{xx}\rangle-CH_3\end{matrix}$ | 118 |
| (8) | benzothiazole-C-S$\begin{matrix}N(\langle\phantom{x}H\phantom{x}\rangle)_2\\N-SO_2-\langle\phantom{xx}\rangle-CH_3\end{matrix}$ | 167 |
| (9) | $Cl,Cl,Cl-\langle\phantom{xx}\rangle-S\begin{matrix}N(C_2H_5)-\langle\phantom{x}H\phantom{x}\rangle\\N-SO_2-\langle\phantom{xx}\rangle-CH_3\end{matrix}$ | 132 |
| (10) | $\langle\phantom{xx}\rangle-S\begin{matrix}N(H)-\langle\phantom{xx}\rangle-NO_2\\N-SO_2-\langle\phantom{xx}\rangle\end{matrix}$ | 148 |
| (11) | $Cl-\langle\phantom{xx}\rangle-S\begin{matrix}N(H)-\langle\phantom{xx}\rangle\\N-SO_2-\langle\phantom{xx}\rangle-Cl\end{matrix}$ | 127 |
| (12) | $O_2N-\langle\phantom{xx}\rangle-S\begin{matrix}N=C(NH_2)(\langle\phantom{xx}\rangle)_2\\N-SO_2-\langle\phantom{xx}\rangle-NO_2\end{matrix}$ | 190 |
| (13) | $O_2N-\langle\phantom{xx}\rangle-S\begin{matrix}N=C(N(CH_3)_2)-OCH_3\\N-SO_2-\langle\phantom{xx}\rangle-CH_3\end{matrix}$ | 120 |
| (14) | $O_2N-\langle\phantom{xx}\rangle-S\begin{matrix}N=C(NH_2)-\langle\phantom{xx}\rangle\\N-SO_2-\langle\phantom{xx}\rangle-CH_3\end{matrix}$ | 168 |

TABLE I—Continued

| No. | Structure | °F. |
|---|---|---|
| (15) | C₆H₅—CH₂—S(=N—SO₂—C₆H₄—CH₃)(NH—SO₂—C₆H₄—CH₃) | 171 |
| (16) | C₆H₅—S(=N—SO₂—C₆H₄—CH₃)(NH—SO₂—C₆H₄—CH₃) | 153 |
| (17) | Cl—C₆H₄—S(=N—SO₂—C₆H₄—CH₃)(NH—SO₂—C₆H₄—CH₃) | 216 |
| (18) | CH₃—(CH₂)₁₁—S(=N—SO₂—C₆H₄—Cl)(NH—SO₂—C₆H₄—Cl) | Oil |
| (19) | [(C₂H₅)₂N—]₂S=N—SO₂—C₆H₅ | 51 |
| (20) | (O(CH₂CH₂)₂N—)₂S=N—SO₂—C₆H₅ | 109 |
| (21) | (C₅H₁₀N—)₂S=N—SO₂—C₆H₄—Cl | 143 |
| (22) | (C₅H₁₀N—)₂S=N—SO₂—C₆H₄—NO₂ | 121 |
| (23) | (C₅H₁₀N—)₂S=N—SO₂—C₆H₅ | 137 |
| (24) | [(C₆H₅—CH₂)₂N—]₂S=N—SO₂—C₆H₄—CH₃ | 148 |

The compounds to be used according to the invention can be added to the polyolefins in amounts of from 0.01 to 10%, preferably 0.02 to 5% by weight based on the polyolefins. In many cases, it can be advisable to use mixtures of the compounds of the present invention with one another or with other stabilizers. The compounds of the invention develop their stabilizing action in both the pure polymers and in mixture thereof with carbon black, aluminum powder, fillers and dyes. Examples of the polyolefins are for example the linear polyethylenes which have a density of approximately 0.94 to 0.98, or polypropylenes.

The stabilizers can be incorporated in the usual manner, for example by treating the polyolefins in powder form with the stabilizers in a kneader, in a ball mill or on the roller. A particularly uniform dispersion of the stabilizers in the polyolefins is produced if the mixture is fed through a heatable extrusion press at a temperature above the melting point of the polyolefins. The polyolefine powder can also be treated with solutions of the stabilizers in a suitable solvent, which can easily be removed again.

The following examples further illustrate the invention without limiting it thereto.

Examples (a) A polyethylene prepared by the low-pressure process and having an average molecular weight of about 90,000 was mixed on a roller, heated to 160° C. with 0.5% of the compounds set out in the following table. The sheet obtained in this way was granulated and molded with an injection moulding machine to form standardized small rods having the dimensions of 50 x 6 x 4 mm. The notch impact strength of these test elements was measured in accordance with DIN 53453 at different times during a storage period lasting up to 32 days at 70° C. and a pressure of 21 atm. of oxygen.

The following table shows the notch impact strength of the polyethylene samples stabilized with the compounds according to the invention. The values correspond to the mean of 10 separate measurements in each case. By way of comparison, the table includes a sample of polyethylene which is without stabilizer:

TABLE II

| | Additive | Notch impact strength (cm. kg./cm.²) | | |
|---|---|---|---|---|
| | | Prior to ageing | After 4 days | After 32 days |
| | Without stabilizer | 38.0 | 1.9 | |
| (1) | (C₆H₅—CH₂—)₂S=N—SO₂—C₆H₅ | 32.5 | 35.5 | 27.1 |
| (2) | (C₆H₅—CH₂—)₂S=N—SO₂—C₆H₄—CH₃ | 35.0 | 36.1 | 25.6 |
| (3) | Cl—C₆H₄—S(=N—SO₂—C₆H₅)(NH—C₆H₅) | 37.0 | 39.8 | 36.1 |
| (4) | Cl—C₆H₄—S(=N—SO₂—C₆H₄—CH₃)(NH—C₆H₅) | 35.5 | 38.2 | 38.3 |

TABLE II—Continued

| Additive | Notch impact strength (cm. kg./cm.²) | | |
|---|---|---|---|
| | Prior to ageing | After 4 days | After 32 days |
| (5) 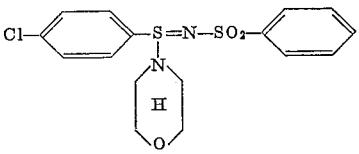 | 37.5 | 37.6 | 37.1 |
| (6) [(C₂H₅)₃N—]₂S=N—SO₂—⟨ ⟩—Cl | 33.3 | 35.5 | 33.5 |
| (7) [(n-C₃H₇)₂N—]₂S=N—SO₂—⟨ ⟩—CH₃ | 36.5 | 35.2 | 31.9 |
| (8) 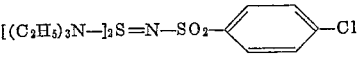 | 38.7 | 37.8 | 38.0 |
| (9) 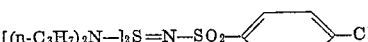 | 35.5 | 36.2 | 36.9 |
| (10)  | 32.0 | 35.1 | 29.5 |
| (11)  | 30.7 | 33.2 | 32.1 |

Instead of polyethylene, it is also possible to use a polypropylene, for example an isotactic polypropylene prepared with the aid of Ziegler catalysts and having a 5% atactic proportion and a density of approximately 0.91. The good values of the notch impact strength are also maintained in this case.

(b) The compounds Nos. 6, 7, 8, 9, 10 and 11 referred to in the above table can, for example, be obtained in the following manner:

*Compound No. 6.*—17.6 grams of bis-(diethylamine) monosulfide are dissolved in 200 ml. of acetone. While stirring, 28.5 grams of sodium N-chloro-p-chlorophenyl-sulfonamide dissolved in 200 ml. of acetone and 50 ml. of water are introduced dropwise over a period of about 5 minutes. The initially clear reaction mixture slowly becomes cloudy in an exothermic reaction, sodium chloride settling as a greasy precipitate on the wall of the vessel. Once the reaction has terminated, heating is continued for about another 30 minutes up to boiling point, and while maintaining stirring. The cooled solution is filtered off from the precipitated sodium chloride and concentrated in vacuo to about ⅓ of its original volume. A light brown oil separates out from the concentrated solution. By adding about 200 ml. of water, the deposition of oil is completed. The oil is isolated in a separating funnel, taken up in about 150 ml. of ether, washed with water and briefly dried over calcium chloride. Thereafter, the solvent is evaporated and the oil which has remained is degasified at about 50° C. and 0.1 mm. Hg. In this way, about 30 grams of a clear light brown, viscous oil are obtained.

*Analysis.* — Calculated for $C_{14}H_{24}O_2N_3S_2Cl$: C, 45.95%; H, 6.61%; N, 11.48%; S, 17.52%; Cl, 9.69%. Found: C, 44.9%; H, 6.2%; N, 11.2% S, 17.7%; Cl, 10.5%.

*Compound No. 7.*—In the same way as described under (b), 23.2 grams of bis-(di-n-propylamine)-monosulfide, dissolved in 200 ml. of acetone, are reacted with a solution of 28 grams of sodium N-chloro-p-toluene-sulfonamide dissolved in 200 ml. of acetone and 50 ml. of water. Once the moderately exothermic reaction has subsided, the reaction medium is heated for another 30 minutes to boiling point and worked up as described in Example 1. A brown clear viscous oil is obtained in this way. Yield about 35 grams.

*Analysis.*—Calculated for $C_{19}H_{35}O_2N_3S_2$: C, 56.82%; H, 8.78%; N, 10.46%; S, 15.97%. Found: C, 56.3%; H, 9.0%; N, 11.2%; S, 15.8%.

(d) *Compound No. 8.*—While stirring vigorously a mixture of 20 grams of dipiperidyl-monosulfide and 200 ml. of acetone has been added thereto a solution of 24 grams of sodium N-chlorobenzene-sulfonamide in 200 ml. of acetone and 50 ml. of water. In a weakly exothermic reaction, the initially clear solution becomes cloudy as a sodium chloride deposit separates out. The reaction mixture is heated for about 15 minutes to boiling point, whereupon it no longer shows an oxidizing action with respect to KI₃ paper. After cooling to room temperature, the substance is filtered off from the sodium chloride precipitate and the clear colorless filtrate is concentrated in vacuo to ¼ of its volume. After adding about 250 ml. of water, it is cooled with ice, whereupon colorless crystals precipitate and are filtered by suction and separated by pressing on clay. The dry residue is dissolved in approximately 100 ml. of benzene and 50 ml. of cleaning benzene are added. On cooling, crystals precipitate from the colorless solution, these crystals melting at 135–137° C. Yield after recrystallization about 25 grams.

*Analysis.*—Calculated for $C_{16}H_{25}O_2N_3S_2$: C, 54.1%; H, 7.1%; N, 11.83%; S, 18.03%. Found: C, 54.3%; H, 7.5%; N, 12.3%; S, 17.9%.

*Compound No. 9.*—A solution of 28 grams of sodium N-chloro-p-toluene-sulfonamide dissolved in 200 ml. of acetone and 30 ml. of water is added dropwise and while stirring into a solution of 20 grams of dipiperidyl monosulfide in 150 ml. of acetone. The reaction mixture is thereafter heated for about another 45 minutes to boiling point. The precipitated sodium chloride is filtered off from the cooled mixture and the solution is concentrated in vacuo to about ⅓ of its original volume. About 250 cc. of water are added to the concentrated reaction mixture. The precipitating colorless crystals are filtered off and washed with water. After being recrystallized from chloroform they have a melting point of 128 to 129° C.

*Compound No. 10.*—A mixture of 125 grams of sodium N-chloro-benzene-sulfonamide and 400 ml. of ethanol+100 ml. of water is stirred into a solution of 102 grams of dimorpholine monosulfide in 400 ml. of ethanol. A clear solution is obtained in a moderately exothermic reaction, which solution is heated for 30 minutes to boiling point while stirring. The solution slowly becomes cloudy by precipitating sodium chloride out and after about 15 minutes reacts neutrally with respect to $KI_3$ paper. The hot solution is filtered and the filtrate is concentrated to half its volume and cooled with iced water. About 80 grams of colorless crystals precipitate after adding 250 ml. of water and these are filtered by suction and dried. After being recrystallized from methanol, the crystals have a melting point of 109° C.

*Analysis.*—Calculated for $C_{14}H_{21}O_4N_3S_2$: C, 46.8%; H, 5.85%; N, 11.7%; S, 17.8%. Found: C, 46.8%; H, 6.03%; N, 11.5%; S, 17.8%.

*Compound No. 11.*—The desired compound is obtained with a yield of about 75% (colorless crystals with a melting point of 162 to 163° C.) by the reaction of equimolecular quantities of dimorpholine monosulfide and sodium N-chloro-p-toluene-sulfonamide in alcohol by the method described for compound 10.

We claim:

1. Solid polyethylene stabilized with a compound of the formula:

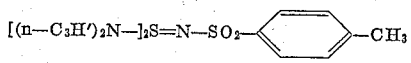

2. Solid polyethylene stabilized with a compound of the formula:

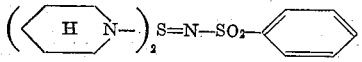

3. As a new composition of matter, a solid polyolefin selected from the group consisting of polyethylene and polypropylene, said polyolefin containing a stabilizer of the general formula:

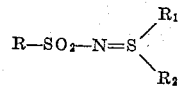

wherein R represents a member selected from the group consisting of a phenyl radical and a phenyl radical substituted by a member selected from the group consisting of chlorine, nitro, and lower alkyl radicals, $R_1$ and $R_2$ each represent a member selected from the group consisting of hydrocarbon radicals containing up to 12 carbon atoms, chlorinated hydrocarbons, nitro-substituted hydrocarbons, amino groups, cyclohexyl-substituted amino groups, alkyl-substituted amino groups, phenyl-substituted amino groups, substituted-amino groups, chlorophenyl-substituted amino groups, aralkyl-substituted amino groups, sulfonamide groups, groups containing the $-N=C<$ radical, and a heterocyclic ring system selected from the group consisting of morpholyl and piperidyl wherein said heterocyclic ring is bonded to the sulfur atom by the nitrogen atom of said ring.

References Cited in the file of this patent

UNITED STATES PATENTS

| 2,334,186 | Fox | Nov. 16, 1943 |
| 2,553,093 | Jacob et al. | May 15, 1951 |
| 2,727,879 | Vincent | Dec. 20, 1955 |
| 2,765,293 | Happoldt | Oct. 2, 1956 |
| 2,852,488 | Clark et al. | Sept. 16, 1958 |

OTHER REFERENCES

Houben-Weyl, 4th ed., vol. 9, page 220 (1955).
Bulmer et al.: Journal of the Chem. Soc., 1945, p. 666.
J.A.C.S., vol. 63, pp. 2939 to 2942 (1941).